United States Patent [19]

Ozawa

[11] Patent Number: 4,926,211
[45] Date of Patent: May 15, 1990

[54] PRINTING PAPER CONVEYING APPARATUS FOR PHOTOGRAPHIC PRINTING APPARATUS

[75] Inventor: Yoshio Ozawa, Kanagawa, Japan

[73] Assignee: Fuji Photo Film Co., Ltd., Kanagawa, Japan

[21] Appl. No.: 256,787

[22] Filed: Oct. 12, 1988

[30] Foreign Application Priority Data

| Oct. 12, 1987 | [JP] | Japan | 62-256656 |
| Oct. 12, 1987 | [JP] | Japan | 62-256657 |
| Jan. 28, 1988 | [JP] | Japan | 63-17673 |
| Feb. 22, 1988 | [JP] | Japan | 63-38940 |

[51] Int. Cl.⁵ .................................................. G03B 27/72
[52] U.S. Cl. ...................................... 355/28; 354/319; 271/270
[58] Field of Search .................... 355/27–29; 354/319; 271/270, 202

[56] References Cited

U.S. PATENT DOCUMENTS

| 3,425,777 | 2/1969 | White | 355/28 |
| 4,331,328 | 5/1982 | Fasig | 271/270 |
| 4,518,241 | 5/1985 | Huss | 354/319 |

Primary Examiner—L. T. Hix
Assistant Examiner—D. Rutledge
Attorney, Agent, or Firm—Sughrue, Mion, Zinn, Macpeak & Seas

[57] ABSTRACT

An apparatus for and a method of conveying a printing paper imprinted with an image by a printing device to a developing apparatus. The conveying apparatus includes a cutter for cutting the image printed printing paper for every image, and contacting and releasing apparatus for raising and conveying a piece of the cut printing paper and for releasing a holding condition of the printing paper. In consequence, a plurality of the pieces of the cut printing paper can be maintained between the printing apparatus and the developing apparatus without overlapping thereof.

21 Claims, 14 Drawing Sheets (A)

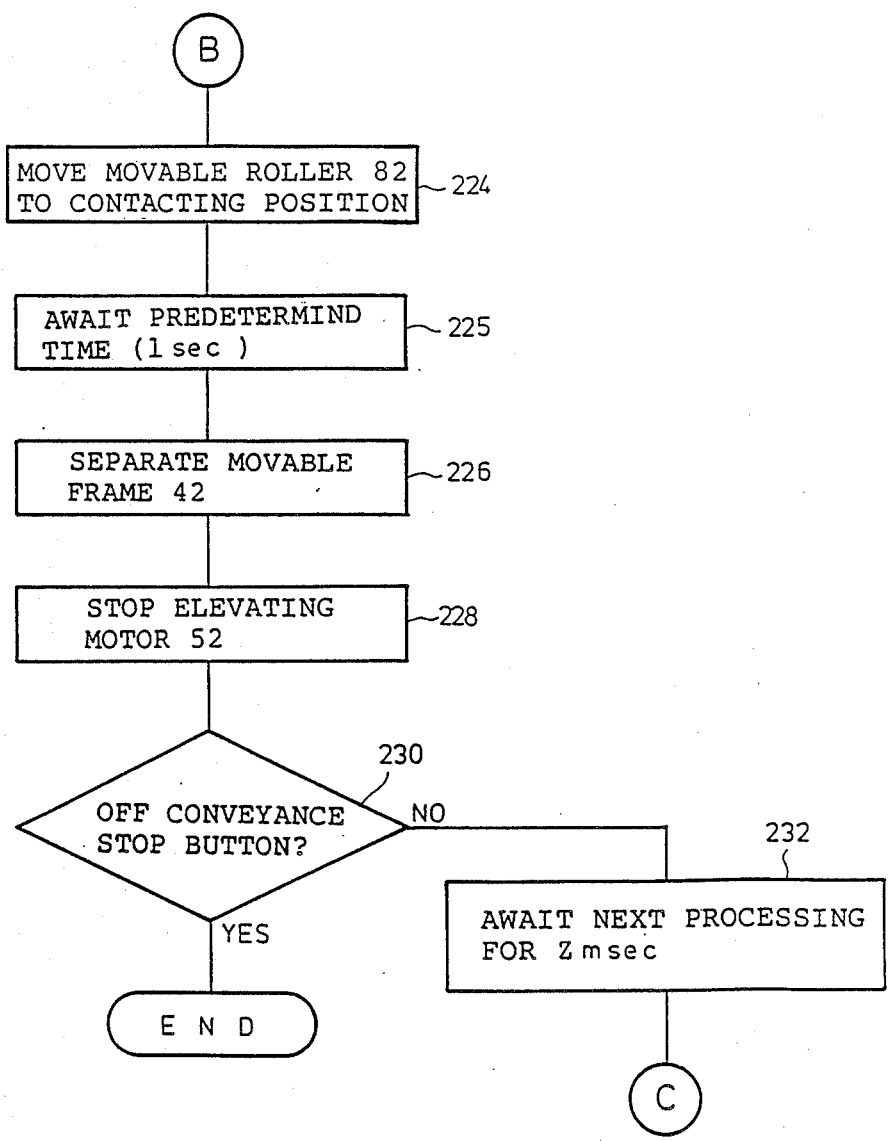

PRINTING PAPER CONVEYING APPARATUS FOR PHOTOGRAPHIC PRINTING APPARATUS

BACKGROUND OF THE INVENTION

1. Field of the Invention

The present invention relates to a printing paper conveying apparatus for a photographic printing apparatus which prints an image of a negative film to a photographic paper, and more particularly, to a conveying apparatus to convey a printed photographic paper to a developing apparatus.

2. Description of the Related Art

In a conventional photographic printing apparatus, there are many types of the apparatus in which a rolled printing paper is fed from its beginning portion to a printing section and, after printing, a printed photographic paper is cut for every image and the printed cut paper is then fed to a developing section.

In the above-described type of the photographic printing apparatus, speed for developing the printed photographic paper in the developing section is lower at a uniform rate, though speed for feeding the printed photographic paper from the printing section to the developing section is higher and feeding thereof is intermittently made. Therefore, an apparatus for holding a continuous printed photographic paper in a loop is used to adjust discrepancy in both speeds of those sections. However, if a printed image on the photographic paper is larger, the holding apparatus must be large size. Moreover, since a portion of the printed photographic paper which is not developed immediately after printing operation is produced, the printing operation for a latter piece of photographic paper has to be suspended until after a former printed photographic paper has been fed into a developing section due to the difference in the speeds of the operations conducted in the both printing and developing section, although it is preferable to cut the printed photographic paper at every image and to feed them to the developing section immediately after printing thereof.

SUMMARY OF THE INVENTION

In view of the aforementioned problems of the conventional conveying apparatus, an object of the present invention is to provide a printing paper conveying apparatus for a photographic printing apparatus to keep a printed photographic paper between a printing apparatus and a developing apparatus.

The present invention is a printing paper conveying apparatus for conveying a photographic printing paper from a printing apparatus to a developing apparatus in the photographic printing apparatus and is comprised of a cutter for cutting the printed photographic paper, and holding and conveying means for conveying pieces of printed cut photographic paper while holding and raising them for conveyance, and releasing them thereafter.

As stated above, in the present invention, the printed photographic paper is cut out by the cutter, and is raised and fed to the developing apparatus by means of the holding and conveying means. Since the holding and conveying means can release the printing paper when necessary, in the state where a former piece of the printed photographic paper has not yet certainly been fed into the developing apparatus, a latter piece of the printed photographic paper is released from holding condition so as to prevent overlapping the former and later pieces thereof.

The holding and conveying means includes rollers which are disposed at both sides of a printing paper conveying path and are releasably, contacted therebetween. Therefore, the printing paper can certainly and easily be held and released by the contact and release of the rollers.

Further, the holding and conveying means can make a plurality of pairs of rollers which are disposed at both the sides of the printing paper conveying path independently separable and releasable from each other, and a part thereof can be driven at the same speed as the developing speed. This enables the intervals between a plurality of pieces of the printed photographic paper conveyed to be narrowed.

DETAILED DESCRIPTION OF THE PREFERRED EMBODIMENTS

Preferred embodiments of the present invention will be described below with reference to the accompanying drawings.

Figure 1:
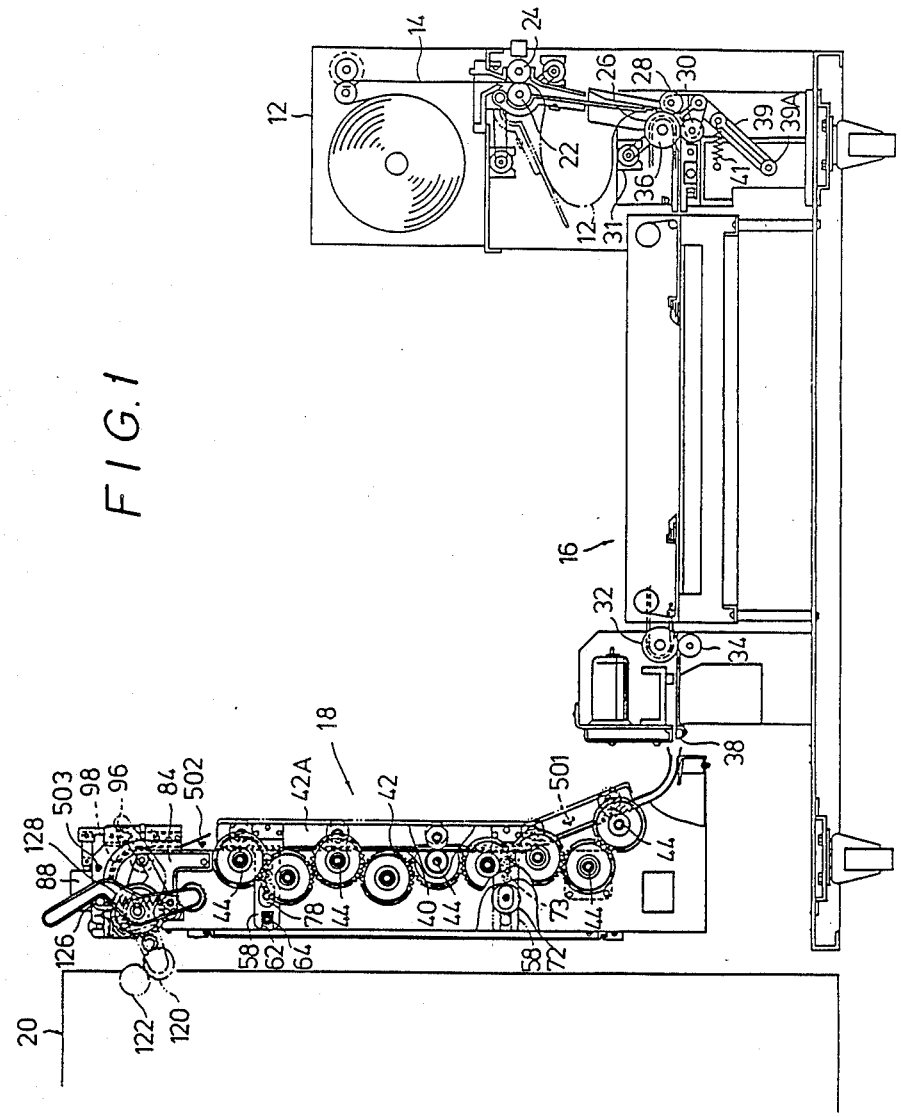
FIG. 1 is a cross-sectional view of a photographic processing apparatus to which the present invention is applied.

Referring first to FIG. 1, a photographic printing apparatus includes a printing paper accommodating portion 12, a printing section 16, a conveying apparatus 18 as holding and conveying means, and a developing section 20.

A photographic or printing paper accommodated in the accommodated portion 12 is fed to the printing section where an image on a negative film is exposed on the printing paper, and is fed to the developing section 20 through the conveying apparatus 18.

The printing paper accommodating portion 12 accommodates a roll of non-exposed printing paper 14. The printing paper 14 is fed continuously to the printing section 16 by a pair of holding and conveying rollers 22 and 24 and holding and conveying rollers 26, 28, and 30. The holding and conveying roller 26 is driven by a motor 31 so as to allow the printing paper 14 to be held and conveyed between the holding and conveying roller 26 and the holding and conveying rollers 28 and 30.

After the image on the negative film which is not shown in the drawings is printed on the printing paper 14, it is fed to a cutter apparatus 38 by a pair of holding and conveying rollers 32 and 34 driven by the motor 31

The conveying device 18 has a fixed frame 40 and a movable frame 42 which can be approached and separated each other as shown in FIGS. 2-4, and 7. The fixed frame 40 has leg plates 40A and 40B disposed at right angles at the two sides thereof (the right and left ends thereof as viewed in FIG. 3). And five supporting shafts 44 are horizontally disposed between the leg plates 40A and 40B in such a manner that they are separated from each other in the vertical direction. Each of the supporting shafts 44 has rollers 46 provided to an intermediate portion thereof. The rollers 46 protrude through openings 47 formed in the fixed frame 40. A gear train 50 is fixed to the end portions of the supporting shafts 44 which are penetrated through the leg plate 40A. The gear grain 50 is connected to an elevating motor 52. The elevating motor 52 drives the rollers 46 such that they convey the printing paper 14 at a speed which is much faster than that at which development is conducted in the developing portion 20.

Figure 2:
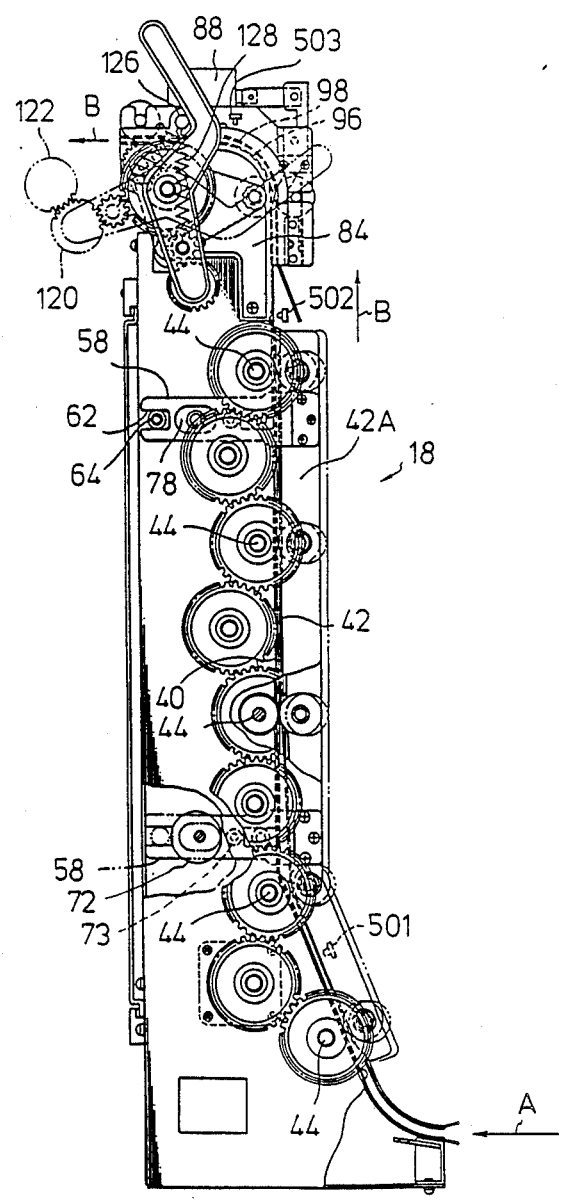
FIG. 2 is a partially broken side elevational view of a conveying apparatus of the present invention.

The movable frame 42 has leg plates 42A and 42B formed at the lateral ends thereof. Supporting shafts 54 are rotatably supported by the leg plates 42A and 42B at positions at which they correspond to the supporting shafts 44. Each of the supporting shafts 54 has a plurality of rollers 56 fixed thereto. The rollers 56 protrude through openings 43 formed in the movable frame 42 so that they can make contact with the outer peripheries of the corresponding rollers 46. Thus, the rollers 46 and 56 form a conveying path for the printing paper 14 therebetween. The printing paper 14 which has been fed out of the printing section horizontally in the direction indicated by an arrow A in FIG. 2 is raised and is then conveyed in the direction indicated by an arrow B through the conveying path.

Figure 7:
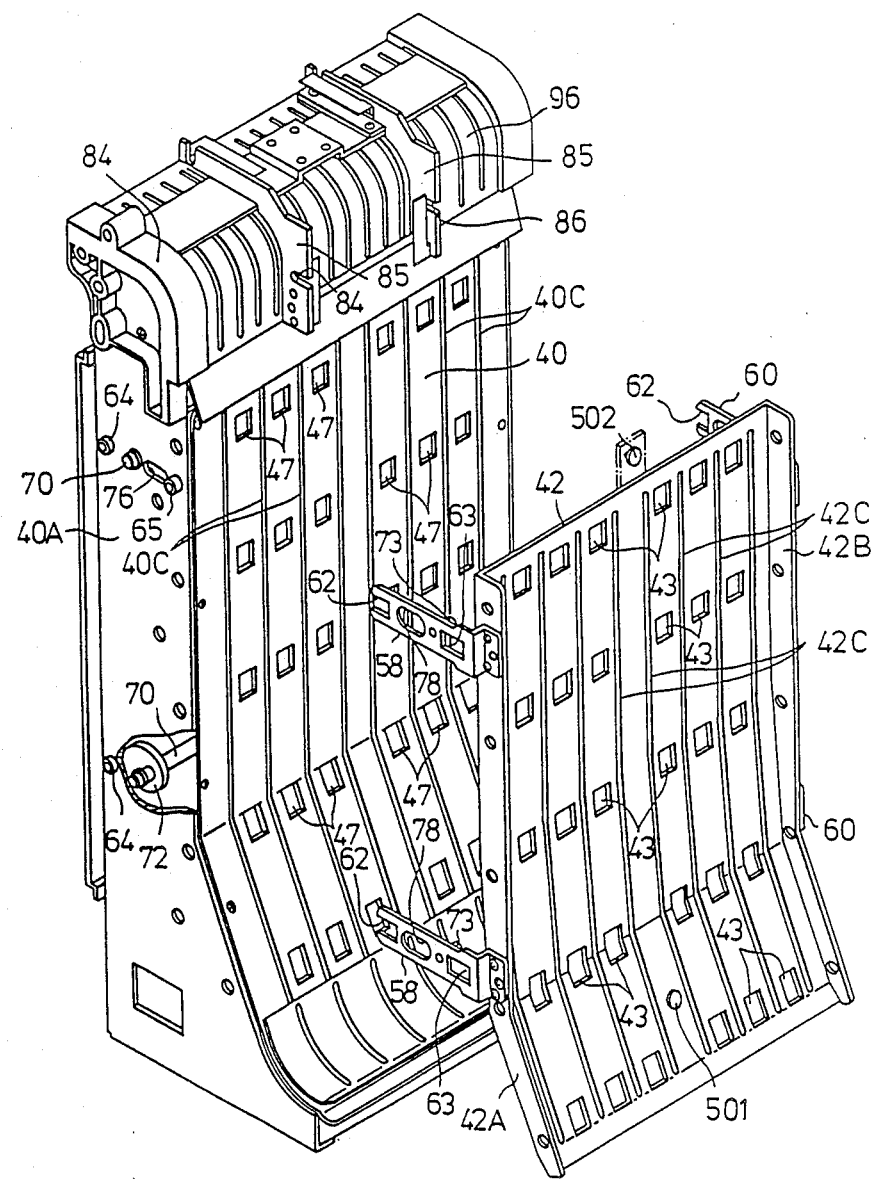
FIG. 7 is an exploded perspective view of frames and their related parts in the conveying apparatus.

The fixed frame 40 and the movable frame 42 are respectively provided with ribs 40C and 42C which protrude toward the conveying path (see FIG. 7).

Arms 58 and ,60 extend from the leg plates 42A and 42B, respectively. The forward and proximal end portions of each of the arms 58 and 60 are respectively provided with long holes 62 and 63 which are elongated in the longitudinal direction. Supporting rollers 64 and 65 supported by the leg plate 40A or 40B are inserted into the holes 62 and 63, respectively. This allows the movable frame 42 to move parallel toward and away from the fixed frame 40 (in the horizontal direction as viewed in FIG. 2) so as to open and close the conveying path of the printing paper.

Figure 3:
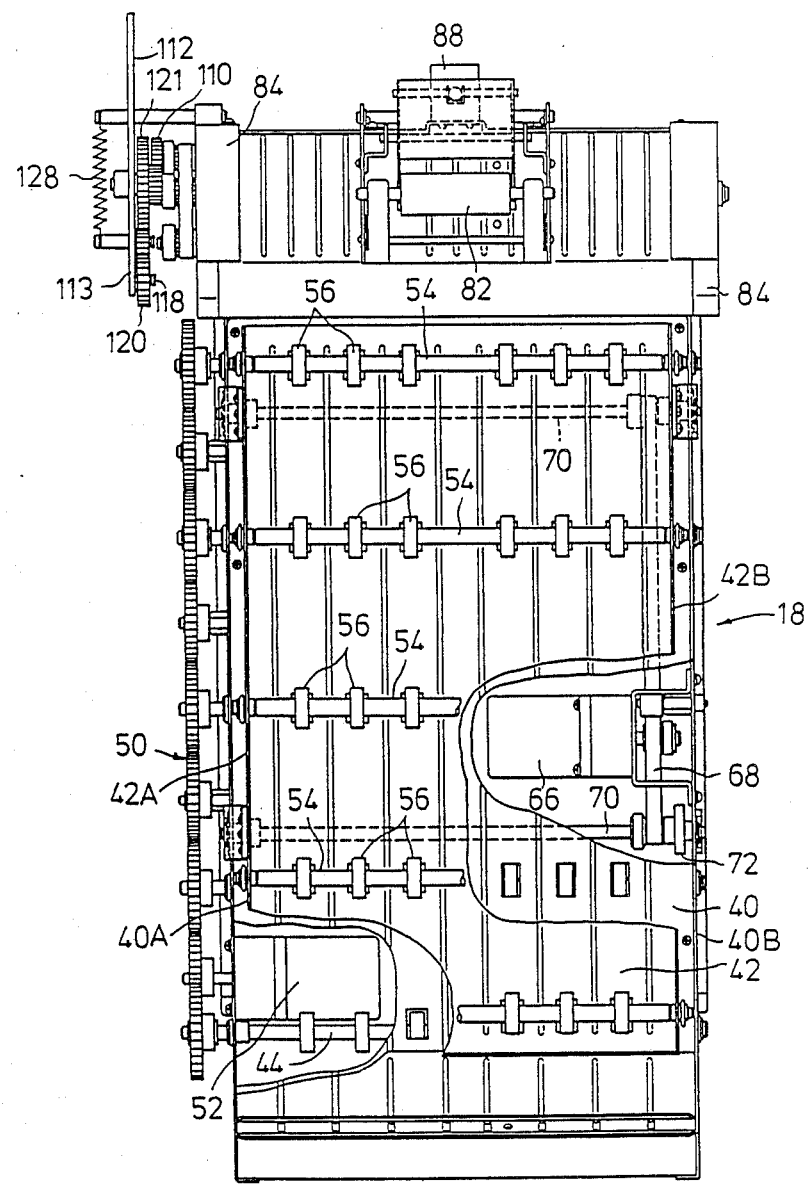
FIG. 3 is a right side view of the conveying device of FIG. 2.
Figure 4:
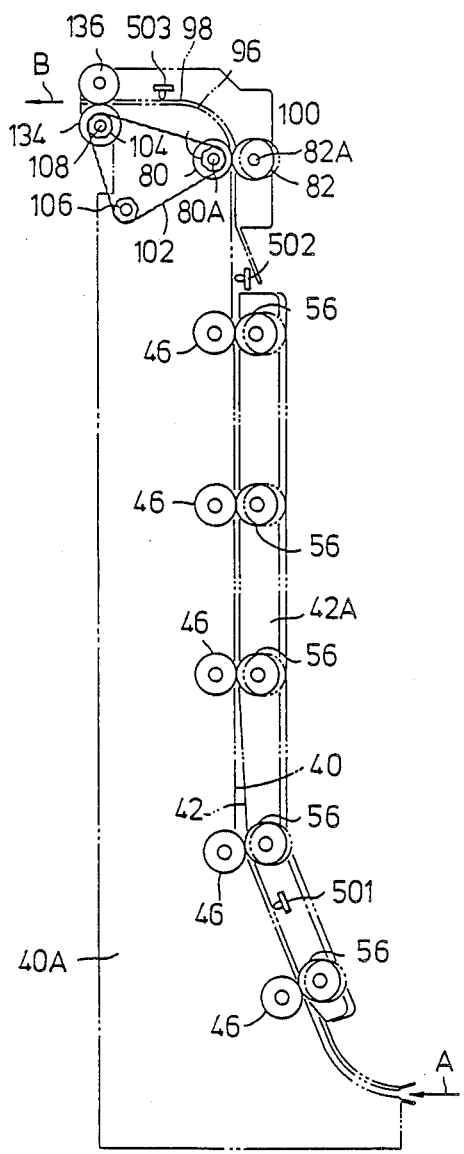
FIG. 4 is an illustration showing arrangement of rollers disposed in a coupling portion between the conveying apparatus and a developing section.

As shown in FIG. 3, a driving motor 66 is provided to the leg plate 40B. An endless belt 68 which is wound around the output shaft of the motor 66 is wound around a plurality of rotary shafts 70 which are provided in such a manner that they are separated from each other in the vertical direction, so as to rotate the rotary shafts 70. The rotary shafts 70 are rotatably supported by the leg plates 40A and 40B. A cam 72 is fixed to each of the two ends of each of the rotary shafts 70 at a portion thereof which is located inside the leg plates 40A or 40B. The cams 72 are engaged with rollers 73 rotatably supported by the arms 58 and 60 so as to allow the movable frame 42 to move toward and away from the fixed frame 40 when the driving motor 66 is rotated. The forward ends of the rollers 73 are inserted into elongated holes 76 formed in the leg plates 40A and 40B and are located inside the leg plates 40A and 40B. The movable frame 42 is urged toward the fixed frame 40 by an elastic body (not shown). Each of the arms 58 and 60 has an elongated hole 78 which receives the end portion of the corresponding rotary shaft 70 which extends through the leg plate 40A or 40B.

A sensor 501 for detecting a forward end of the printing paper is disposed above the lowest supporting shafts 44 and 45 in the five supporting shafts which are separated from each other in the vertical direction.

Figure 5:
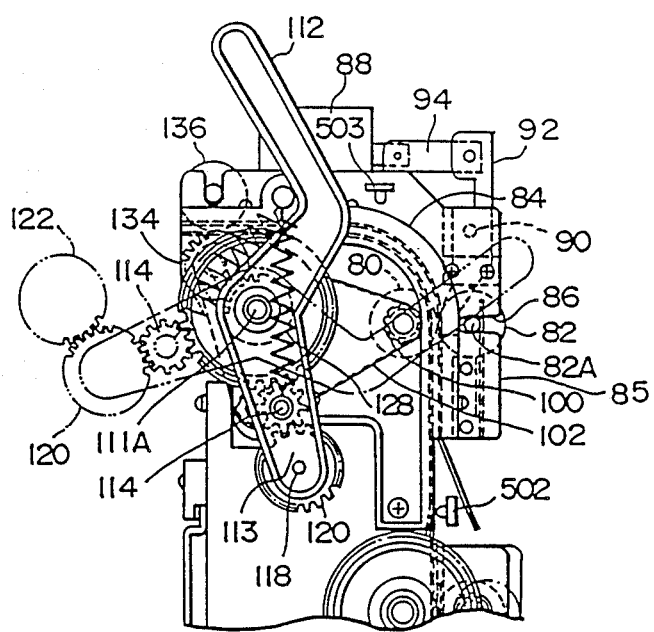
FIG. 5 is a side elevational view showing a coupling structure between the conveying apparatus and the developing section.
Figure 6:
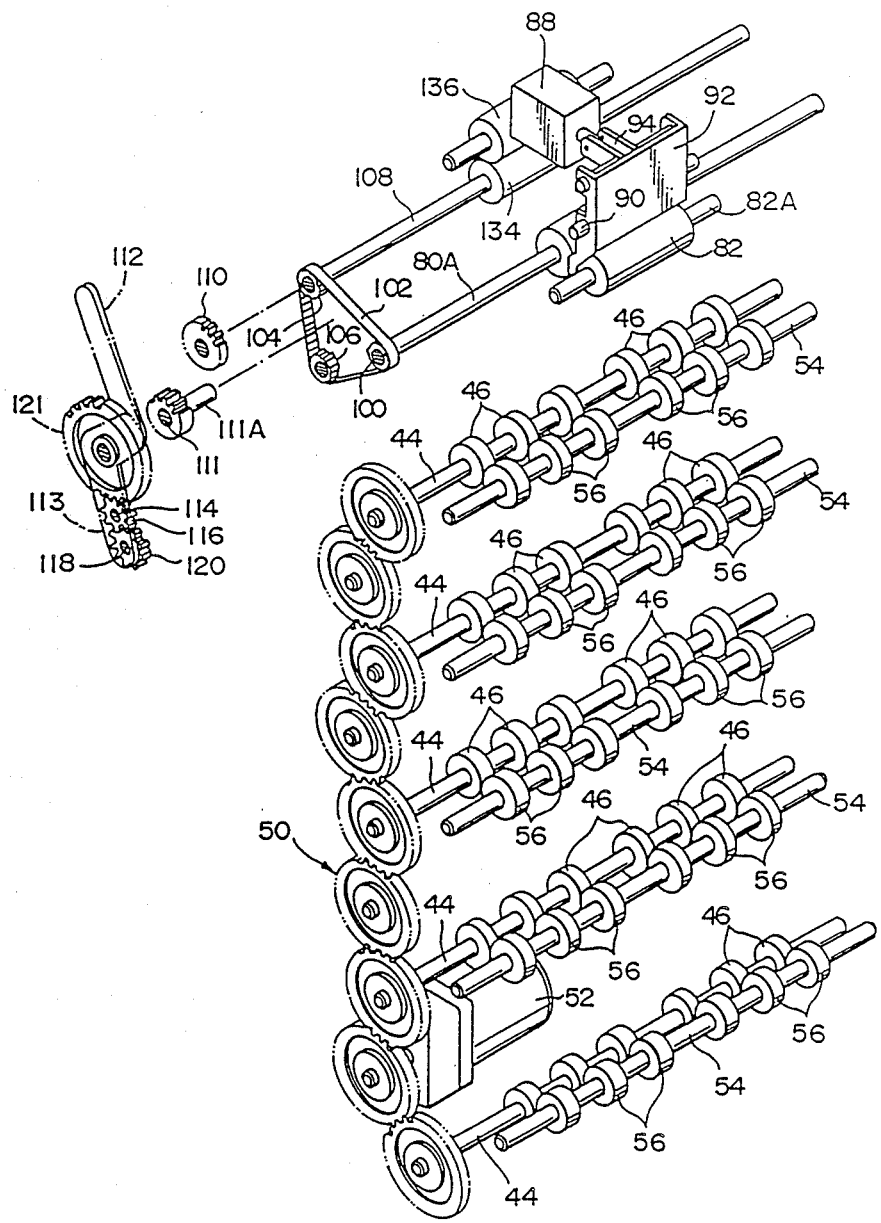
FIG. 6 is an exploded perspective view of rollers and their related parts in the conveying apparatus.

A roller 80 is disposed right above the uppermost rollers 46 at one side of the conveying path for the printing paper 14 while a movable roller 82 is provided above the uppermost rollers 56 at other side of the conveying path. The rollers 80 and 82 and the conveying apparatus 18 in combination form a holding and conveying means. The roller 80 is supported by a shaft 80A which is rotatably supported on an extended frame 84 extending from the leg plates 40A and 40B, and the roller 82 is supported by a shaft 82A which is accommodated in guide grooves 86 formed in brackets 85 fixed to the extended frame 84, in such a manner that it can move toward and away from the roller 80. The movable roller 82 is urged by a spring (not shown) in the direction in which it makes contact with the roller 80. However, the roller 82 is moved away from the roller 80 by the actuation of a solenoid 88. To achieve this movement of the roller 82, the intermediate portion of a locker arm 92 is pivotally supported on the extended frame 84 by pins 90. One end of the locker arm 92 faces the support shaft 82A, and the other end thereof is coupled to the solenoid 88 through a tension link 94. As a result, when the solenoid 88 is actuated, the locker arm 92 is pivoted counterclockwise as shown in FIG. 5 so as to allow the movable roller 82 to move away from or release the roller 82. The roller 82 is in contact with the roller 80 while the solenoid 88 is not actuated.

Guide plates 96 and 98 are provided at downstream portion of the rollers 80 and 82. The guide plates 96 and 98 are connected to the printing paper conveying path formed between the fixed frame 40 and the movable frame 42, and are adapted to send the printing paper 14 to the developing section 20 after having changed the direction of the printing paper 14 substantially in the horizontal direction.

A gear 100 is fixed to one end of the roller supporting shaft 80A. An endless belt 102 which is wound around the gear 100 is also wound around gears 104 and 106 in such a manner that it substantially forms a triangular form.

A large gear 110 is fixed to a rotary shaft 108 to which the gear 104 is fixed. A gear 111 which is engaged with the large gear 110 is fixed to a support shaft 111A, and a rotary arm 112 is pivotally supported by the shaft 111 A coaxially with respect to the gear 111. A support arm 113 extends from part of the rotary arm 112. A planetary gear 116 and a coupling gear 120 are rotatably supported by the support arm 113 through a support shaft 114 and a support shaft 118, respectively. The planetary gear 116 is in mesh with the coupling gear 120 and a gear 121. The gear 121 is coupled to the gear 111 through the support shaft 111A. As a result, when the rotary arm 112 is pivoted clockwise from a state shown by the solid line to a state shown by the imaginary line in FIG. 5, the coupling gear 120 engages with a transmission gear 122 which is driven by a motor (not shown) in the developing section 20.

This allows the rotary force generated in the developing section 20 to be transmitted to the roller 80 in the state shown by the imaginary line in FIG. 5. The roller 80 is stopped when the rotary arm 112 is in the state shown by the solid line.

A tension coil spring 128 is provided between the support shaft 114 and a pin 126 of the extended frame 84. The tension coil spring 128 passes the axis of the support shaft 111A and moves to the opposite side thereof when the rotary arm 112 is pivoted from the state shown by the solid line to the state shown by the imaginary line, by which the rotary arm 112 is pivoted in a snap action between the states shown by the imaginary line and the solid line.

A conveying roller 134 is fixed to the rotary shaft 108 on which the gear 104 is mounted. The conveying roller 134 is disposed at one side of the printing paper 14 which is conveyed in the horizontal direction, in such a manner that it is in contact with a roller 136 rotatably provided on the other side of the printing paper 14 so as to drive the printing paper 14.

A sensor 502 for mainly detecting the rear end of the printing paper 14 is disposed between the pair of rollers 46 and 56 and the pair of rollers 80 and 82, and a sensor 503 for mainly detecting the forward end of the printing paper 14 is provided between the pair of rollers 80 and 82 and the pair of rollers 134 and 136.

Next, the operation of this embodiment will be described below.

The printing paper 14 of the roll accommodated in the printing paper accommodating portion 12 is drawn out to the printing section 16 by the holding and conveying rollers 22 and 24 as well as by the rollers 26, 28 and 30 so as to print the image thereon from a negative (not shown).

Figure 8:
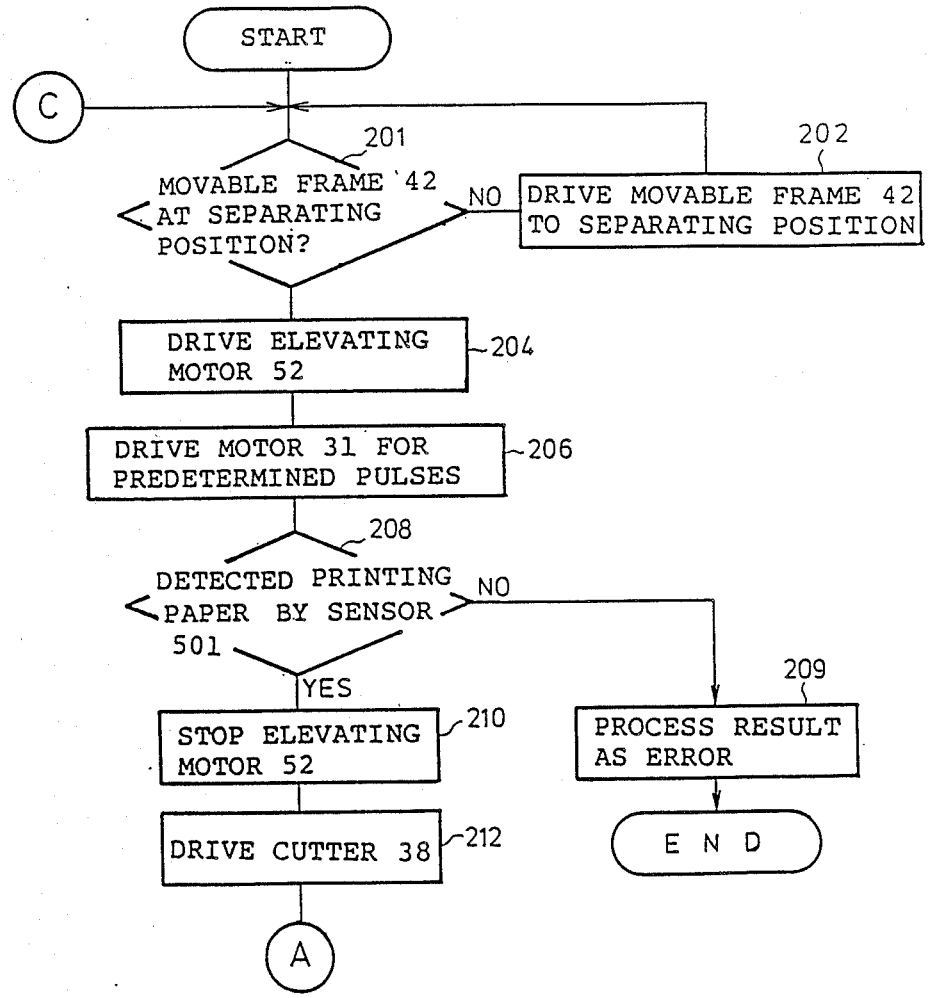
FIGS. 8(A), 8B, and 8(C) are flowcharts showing operation of the conveying apparatus.
Figure 8:
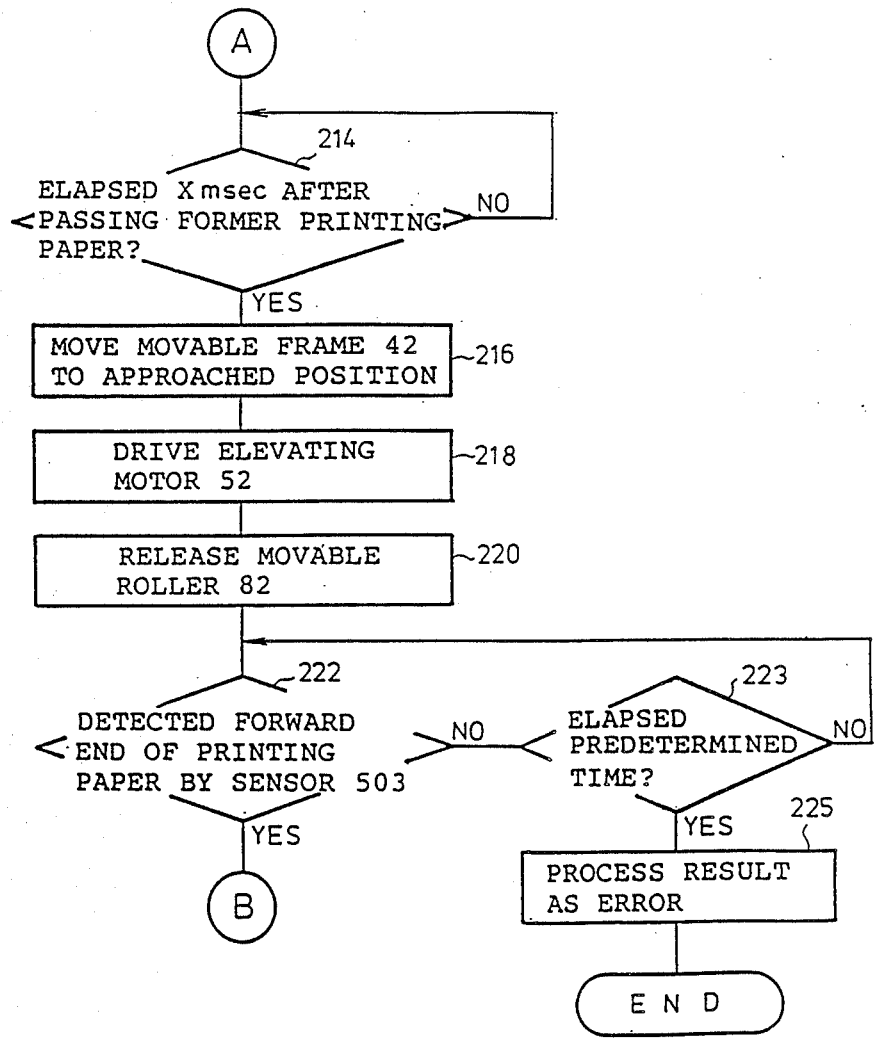
Figure 8:
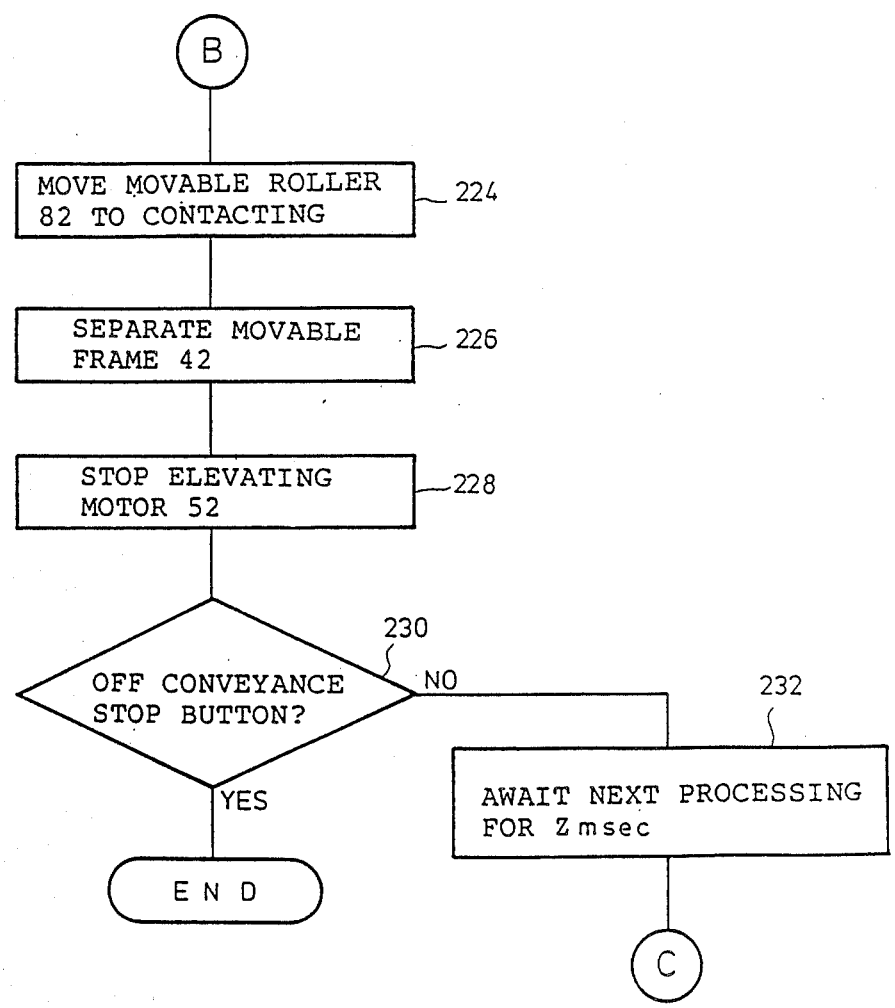

Thereafter, in step 201 of the processing shown in FIG. 8, determination is made as to whether or not the movable frame 42 is at an opened position where it is separated from the fixed frame 40, that is, whether or not the movable frame 42 of the conveying device 18 has been moved away from the fixed frame 40. If the answer is negative, the movable motor 66 is actuated so as to rotate the cams 72 and thereby separate the movable frame 42 from the fixed frame 40 (in Step 202).

If the answer is affirmative, the elevating motor 52 is driven so as to rotate the rollers 46 in Step 204, and the motor 31 is driven a predetermined number of pulses in Step 206. Subsequently, it is determined whether or not the forward end portion of the printing paper 14 has passed the sensor 501. If not, the process goes to Step 209 where the determination result is processed as an error. If it has been determined that the forward end of the printing paper 14 has passed the sensor 501, the elevating motor 52 is stopped in Step 210, and the cutter 38 is actuated so as to cut the printing paper at the rear end of the portion thereof which carries an image in Step 212.

Thereafter, in Step 214 it is determined whether or not X msec has elapsed following the passage past the sensor 502 of the piece of printing paper 14 which was conveyed in the preceding process. As the former piece of printing paper on which printing was conducted last time had been fed to the developing section 20 by the time the printing operation for the latter piece of printing paper is started, a decision is made that at least X msec has elapsed.

After X msec has passed, the opening motor 66 is actuated in Step 216 to move the movable frame 42 close to the fixed frame 40 and thereby bring the rollers 56 into contact with the rollers 46, and at the same time the elevating motor 52 is actuated in Step 218 so as to rotate the rollers 46 and 56. Furthermore, in Step 220, the solenoid 88 is actuated so as to release the movable roller 82 from the roller 80. The rotary arm 112 is set beforehand to the state shown by the imaginary lines in FIGS. 3 and 5 so as to allow the rollers 80 and 134 to be driven at a speed at which the printing paper is conveyed in the developing portion.

Thereafter, it is determined in Step 222 whether or not the forward end of the printing paper 14 has been detected by the sensor 503. If the forward end of the printing paper 14 is not detected within a predetermined time, the process goes to steps 223 and 225 where the determination result is processed as an error. If the forward end of the printing paper 14 is detected within the predetermined time, the solenoid 88 is de-energized in Step 224 so as to bring the movable roller 82 into contact with the roller 80. At the same time, the opening motor 66 is rotated so as to move the movable frame 42 away from the fixed frame 40 in Step 226, and the elevating motor 52 is stopped in Step 228. These allow the printing paper to enter the developing section 20 in the direction indicated by the arrow B under the action of the pair of rollers 80 and 82 and the conveying rollers 134 and 136 which are driven at the same speed as which the printing paper is conveyed in the developing section 20. At this time, since the rear end of the printing paper 14 is not held by the rollers 46 and 56, the printing paper is not subjected to any external force.

Thereafter, it is determined in Step 230 whether or not a conveyance stop button (not shown) has been pressed. If the conveyance stop button has been pressed, the operation stops in the printing paper accommodating portion 12, the printing section 16, and the conveying device 18, except for the developing section 20. If it is determined that the button has not been pressed, Z msec is allowed to pass in Step 232 before the subsequent process is started, and then the process returns to Step 201.

The period of X msec indicated in Step 214 will be described in detail below.

The period X msec represents the time from when the rear end of the former piece of printing paper passes the sensor 502 to when conveyance of the latter piece of printing paper is started. Assuming that both the former and latter pieces of printing paper are conveyed in the developing section 20 at an interval of d mm, the time $t_1$ that it takes for the former piece of printing paper to reach the position which is d mm upstream of the sensor 503 after it has passed the sensor 502 is expressed by the following equation:

$$t_1 = \frac{l_1 - l_2 + d}{p} \quad (1)$$

where $l_1$ is the distance from the cutter 38 to the sensor 503, $l_2$ is the distance from the cutter 38 to the sensor 502, and p is the speed at which the printing paper 14 is conveyed in the developing section 20. The time $t_2$ that it takes for the latter piece of printing paper to reach the sensor 503 after having passed through the conveying apparatus is expressed as follows $$t_2 = a + \frac{l_1 - L}{V} \quad (2)$$

where L is the length of the piece of printing paper, a is the speed at which the movable frame 42 is moved away from the fixed frame 40, and V is the linear velocity at which the rollers 46 and 56 are driven by the elevating motor 52. Thus, the X msec is obtained by the following equation:

$$X = \frac{l_1 - l_2 + d}{p} - \left[ a + \frac{l_1 - L}{V} \right] \quad (3)$$

The selection of the obtained value X enables the former and latter pieces of printing paper to be conveyed in the developing section 29 at an interval d.

Next, the period of Z msec indicated in Step 232 represents the time from when the forward end of the former piece of printing paper passes the sensor 503 to when the latter piece of printing paper is fed out into the conveying apparatus by the motor 31. Assuming that the latter piece of printing paper (having a length $L_1$) has passed the enters the conveying apparatus 18 immediately after the former piece of printing paper (having a length $L_1$) has passed the sensor 503, the overlap S between the latter piece of printing paper and the former piece of printing paper is expressed by the following equation:

$$S = L_1 + L_2 - l_1 \quad (4)$$

Where Z msec is the time delay and P mm/sec is the speed at which the printing paper is conveyed in the developing section, the overlap S is expressed as follows:

$$S = L_1 + L_2 - l_1 - P \cdot Z \quad (5)$$

If S=0, Z is obtained by the following equation:

$$Z = \frac{L_1 + L_2 - l_1}{P} \quad (6)$$

Thus, the former and latter pieces of printing paper can be fed to the developing section 20 without overlapping each other when the latter piece of printing paper is fed into the conveying apparatus Z msec after the former piece of printing paper has passed the sensor 503.

Table 1 lists values for X and Z obtained when $l_1 = 768$ mm, $l_2 = 726$ mm, the linear velocity of the conveying apparatus 18 is 157 mm/sec at a frequency of 50 Hz and 188.5 mm/sec at a frequency of 60 Hz, a is 0 .3 sec at a frequency of 50 Hz and 0.25 sec at a frequency of 60 Hz, d is 30 mm, and p is 9.5 mm/sec.

TABLE 1

| L mm | X msec 50 Hz | X msec 60 Hz | Z msec |
|---|---|---|---|
| 152 mm | 3.36 | 4.06 | — |
| 203 mm | 3.68 | 4.33 | — |
| 254 mm | 4.01 | 4.60 | — |
| 305 mm | 4.33 | 4.87 | — |
| 356 mm | 4.66 | 5.14 | — |
| 456 mm | 5.30 | 5.68 | 15.4 |

The former and latter pieces of printing paper can be fed at a sufficient interval and without overlapping each other, if they are conveyed using the above-listed X msec and Z msec values. When L mm is 384 mm or less, Z msec becomes a negative value which is substantially 0 sec.

In the above-described embodiment, the movable frame 42 is moved to approach or to separate from the fixing frame 40 by a combination of motor and cams shown in FIGS. 1 and 2. However, they can be driven by any other means.

Next, a second embodiment of the present invention will be described below with reference to FIGS. 9 and 10. This embodiment is designed to prevent the printing paper from falling within the conveying apparatus 18.

Figure 9:
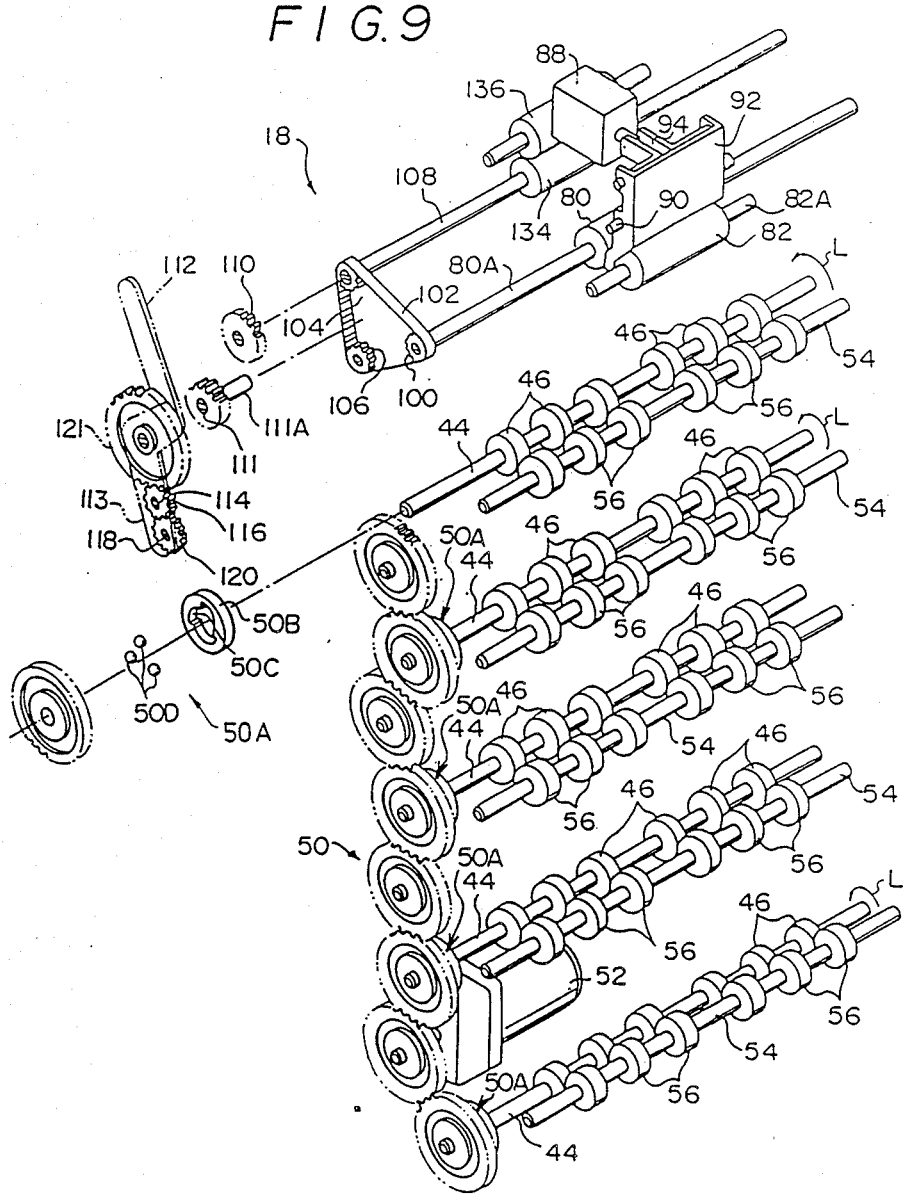
FIG. 9 is an exploded perspective view of rollers and their related parts of a second embodiment of the present invention, corresponding to the view of FIG. 6.

More specifically, a one-way clutch 50A is provided between each of the gears in the gear train 50 and each of the supporting shafts 44, as shown in FIG. 9. The one-way clutch 50A is composed of a ring 50B fixed to each of the gears in the gear train 50, and balls 50D interposed between the inner peripheral surface 50C of the ring 50B and the supporting shaft 44. This one-way clutch 50A allows the rollers 46 to rotate only in the direction in which the printing paper 14 held by the rollers 46 is elevated (the direction indicated by the arrows L) but not to rotate it in the opposite direction in which the printing paper 14 falls by its own weight when the elevating motor 52 is stopped.

Figure 10:
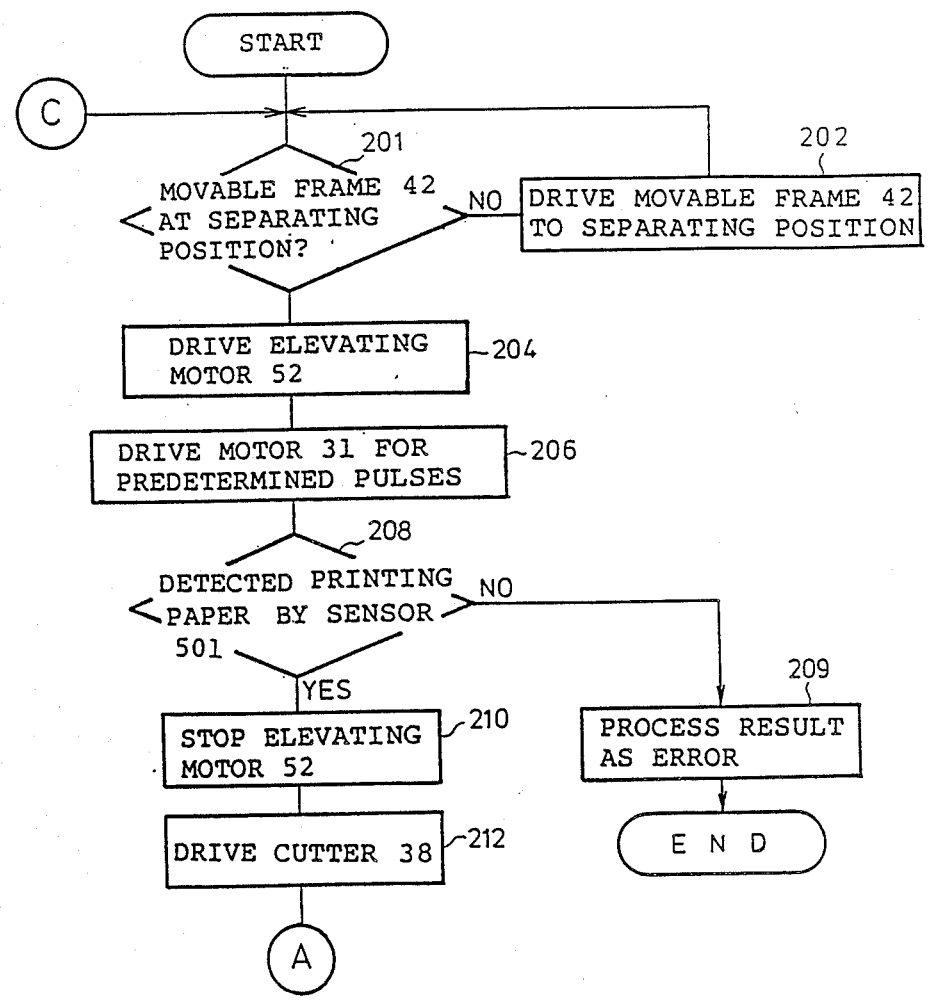
FIGS. 10(A), 10(B), and 10(C) are flowcharts showing operation of the conveying apparatus of the second embodiment.
Figure 10:
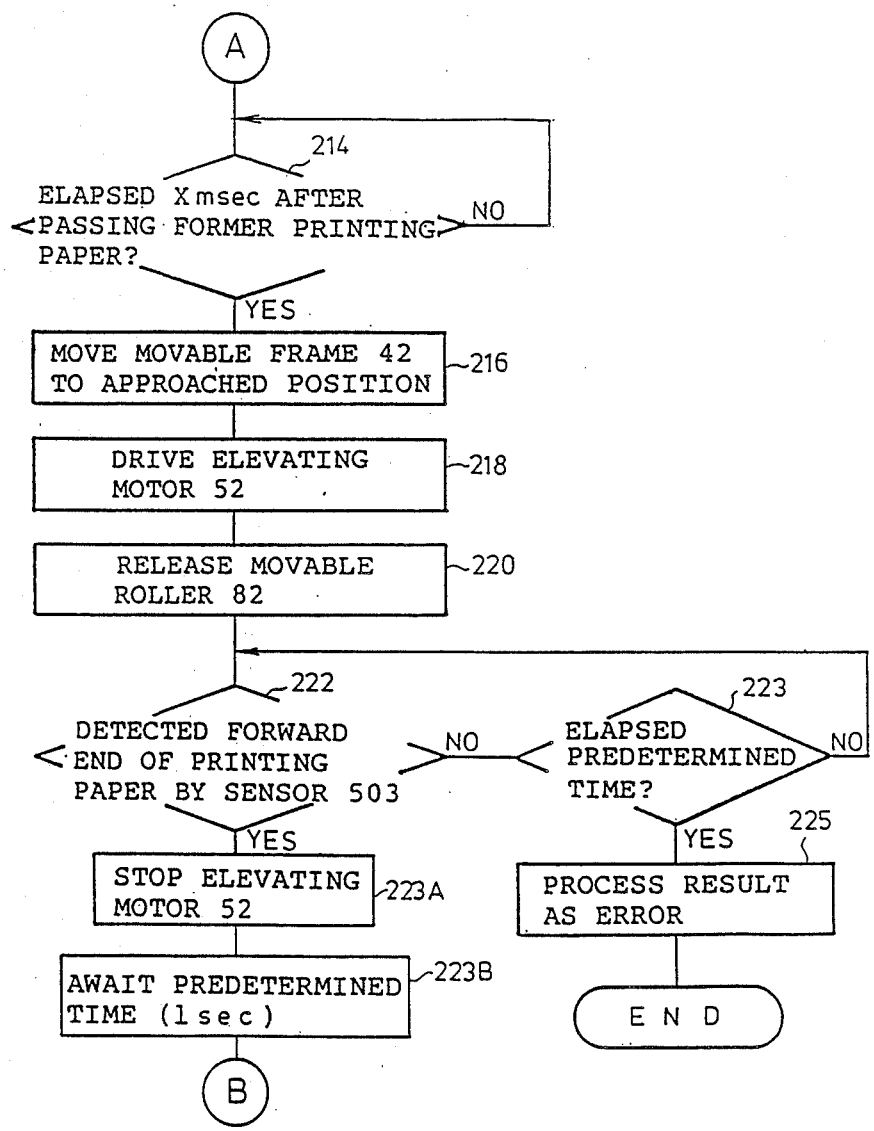

In the flowchart shown in FIG. 10, steps 223A and 223B are added to the processing executed for the first embodiment. After the forward end of the printing paper has been detected by the sensor 503 in Step 222, the elevating motor 52 is stopped. Thereafter, a predetermined time (e.g., 1 sec) is allowed to pass, and the movable roller 82 is brought into contact with the roller 80 in Step 224. Subsequently, a predetermined time (e.g., 1 sec) is allowed to pass in Step 225, and the movable frame 42 is moved away in Step 226.

Thus, the one-way clutch 50A prevents the printing paper 14 from falling by the time the movable roller 82 is brought into contact with the roller 80 in Step 224, and the movable frame 42 is moved away after the movable roller 82 has been brought into contact It is therefore not necessary for the movable roller 82 to be brought into contact concurrently with the separation of the movable frame 42 from the fixed frame.

The movable frame 42 may be approached to the fixed frame after Step 210 has been executed and before Step 212 is executed. This means that the forward end of the piece of printing paper which is to be cut out is held by the frames, and shifting of the printing paper caused by the cutting can be prevented.

What is claimed is:

1. A printing paper conveying apparatus for conveying a piece of printing paper unprinted with an image in a photographic printing section to a developing apparatus, comprising:
    (a) a cutter for cutting the image printed paper for every image;
    (b) a guide passage for directing the pieces of printing paper which have been cut out upwardly and then guiding them to said developing apparatus;
    (c) holding and conveying means provided in said guide passage for holding the pieces of printing paper, and giving driving force thereof; and
    (d) contacting and releasing a means for releasing holding force of said holding and conveying means, whereby a latter piece of the printing paper is fed at high speed in the state where a former piece of printing paper is being fed into said developing apparatus so as to narrow the interval between the former and latter pieces of the printing paper and prevent overlapping therebetween.

2. A printing paper conveying apparatus according to claim 1, wherein said holding and conveying means comprise a pair of rollers which are disposed at both sides of said guide passage in such a manner as to be rotatable for giving driving force to the printing paper.

3. A printing paper conveying apparatus according to claim 2, wherein said contacting and releasing means includes a driving source for releasing said rollers.

4. A printing paper conveying apparatus according to claim 1, wherein said holding and conveying means includes a plurality of pairs of rollers which are disposed at both sides of said printing paper guide passage in such a manner as to be rotatable, and said plurality of pairs of rollers are able to be brought into contact with and separated from each other independently by said contacting and releasing means.

5. A printing paper conveying apparatus according to claim 4, wherein the pair of rollers which are located closer to said printing apparatus are rotated at higher speed than speed at which the pair of rollers located closer to said developing apparatus are driven.

6. A printing paper conveying apparatus according to claim 5, wherein the pair of rollers located closer to said developing apparatus are driven at the same speed at which the printing paper is conveyed in said developing apparatus.

7. A printing paper conveying device according to claim 5, wherein the driving force of said developing apparatus is transmitted to the pair of rollers located closer to said developing apparatus.

8. A printing paper conveying apparatus according to claim 6, further comprising a clutch interposed between the pair of rollers located closer to said developing apparatus and said developing apparatus.

9. A printing paper conveying apparatus according to claim 2, wherein said roller of said holding and conveying means has a one-way clutch which prevents falling of the printing paper.

10. A printing paper conveying apparatus according to claim 4, further comprising control means for allowing the latter piece of printing paper to enter said conveying apparatus by bringing the pair of rollers disposed closer to said developing apparatus into contact with each other and by separating the pair of rollers closer to said printing apparatus from each other, in the state where the former piece of printing paper is held by the pair of rollers located closer to said developing apparatus which is achieved by separating the pair of rollers closer to said developing apparatus from each other and by bringing the pair of rollers closer to said printing apparatus into contact with each other and then driving the same.

11. A printing paper conveying apparatus according to claim 4, further comprising a sensor for detecting the state where the forward end of the printing paper is being held by the pair of rollers located closer to said printing apparatus so as to allow said cutter to actuate.

12. A printing paper conveying apparatus according to claim 4, further comprising a sensor for detecting the state where the former piece of printing paper has reached a predetermined position so as to allow the pair of rollers located closer to said printing apparatus to be brought into contact with each other.

13. A printing paper conveying apparatus according to claim 4, further comprising a sensor for detecting the state where the latter piece of printing paper has reached a predetermined position so as to allow the pair of rollers located closer to said developing apparatus to be brought into contact with each other.

14. A method of conveying a printing paper unprinted with an image from a photographic printing section to a developing apparatus in a photographic printing apparatus, characterizing by: after passing a rear end of a former piece of the printing paper conveyed at a developing speed from said printing section at a predetermined position, a latter piece of the printing paper being conveyed at higher speed than developing speed, and an interval between the former and latter pieces of printing paper in said developing apparatus being maintained in narrow state.

15. A printing paper conveying method according to claim 14, wherein a pair of holding and conveying rollers are provided between said photographic printing section and said developing apparatus, said pair of holding and conveying rollers are released from each other so as to enable said latter piece of printing paper to be inserted therebetween at high speed in the state where said former piece of printing paper is conveyed at the same speed as that in said developing apparatus.

16. A printing paper conveying method according to claim 14, wherein both the pair of rollers for holding and conveying the printing paper disposed closer to said photographic printing apparatus and the pair of rollers for holding and conveying the printing paper disposed closer to said developing apparatus can be contactable and releasable from each other independently.

17. A printing paper conveying method according to claim 16, wherein said pair of rollers disposed closer to said developing apparatus are driven at the same speed as said developing apparatus, and said pair of rollers disposed closer to said printing apparatus are driven at higher speed than that at which said pair of rollers closer to said developing apparatus are driven.

18. A printing paper conveying method according to claim 17, wherein printing paper conveying force in said developing apparatus is transmitted to said pair of rollers disposed closer to said developing apparatus.

19. A printing paper conveying method according to claim 18, wherein a clutch is interposed between said developing apparatus and said pair of rollers disposed closer to said developing apparatus.

20. A printing paper conveying apparatus in a photographic printing apparatus for raising and conveying an image exposed printing paper from a photographic printing section to a developing apparatus, comprising: first holding and conveying means for holding and raising the printing paper; first contacting and releasing means for contacting and releasing said first holding and conveying means between a position of releasing the printing paper and a position of holding the printing paper; driving means for driving said first holding and conveying means; a one-way clutch interposed between said driving means and said first holding and conveying means so as to prevent the printing paper from moving reversely toward said photographic printing section; second holding and conveying means for conveying the printing paper raised by said first holding and conveying means to said developing apparatus at a conveying speed of said developing apparatus; second contacting and releasing means for contacting and releasing said second holding and conveying means between a position of un-holding the printing paper and a position of holding the printing paper; and control means for stopping driving operation of said driving means before said second holding and conveying means being contacted by said second contacting and releasing means.

21. A printing paper conveying apparatus in a photographic printing apparatus according to claim 20, wherein the printing paper conveying force in said developing apparatus is transmitted to said second holding and conveying means through said clutch.

* * * * *